March 10, 1964 SAKAE AKIYAMA 3,124,499
APPARATUS FOR MAKING RUBBER-LINED HOSE
Filed Dec. 31, 1959 2 Sheets-Sheet 1

INVENTOR
Sakae Akiyama
BY *Wenderoth, Lind + Ponack*
ATTORNEYS

INVENTOR
Sakae Akiyama

ATTORNEYS

United States Patent Office 3,124,499
Patented Mar. 10, 1964

3,124,499
APPARATUS FOR MAKING RUBBER-LINED HOSE
Sakae Akiyama, Minoo, Japan, assignor to Ashimori Industry Co., Ltd., Osaka, Japan
Filed Dec. 31, 1959, Ser. No. 863,230
Claims priority, application Japan Sept. 25, 1959
2 Claims. (Cl. 156—423)

This invention relates to an improved method of manufacturing a textile or woven hose provided with a rubber lining, and also to an apparatus for carrying out the method.

An object of the present invention is to provide a textile or woven hose having a rubber lining on the inner wall which is light in weight, flexible in use and handling, has low internal resistance to flow and shows excellent water-tightness.

Another object of the invention is to provide a method and apparatus which enables the continuous, economical and effective manufacture of a rubber lined textile or woven hose having various advantages as mentioned above.

A hose according to this invention may have various known uses which ordinary textile or woven hoses have had. Thus a hose manufactured according to this invention can be used as a fire hose, irrigation hose and other water and fluid transferring or conducting hose.

Briefly stated, the method of this invention is characterized by the following successive steps:

(1) A soft, flexible and elongated core tube which is made of a synthetic plastic material and which has been caused to assume its full tubular or elongated cylindrical shape is passed through a rubber latex solution bath.

(2) After leaving the latex solution bath, the core tube with a thin layer or coating of the vulcanizable rubber latex thereon is passed through a suction box and then dried.

(3) A rubber latex which acts as an adhesive is injected into a textile or woven hose body previously produced by any suitable known manner.

(4) The rubber coated core tube as prepared by the above step (2) is inserted into the textile hose body of step (3).

(5) An internal pressure is applied to the core tube to inflate the same and to expand the rubber coating against the inner wall of the textile hose body.

(6) While the said pressure is being applied, a surface treating agent is applied to the external surface of the textile hose body.

(7) Then the pressure is released and the whole is subjected to a heating-drying treatment.

(8) Compressed air mixed with an exfoliation aid such as talc powder is injected between the core tube and the thin rubber layer bonded to the inner wall of the hose body, to exfoliate and remove the tubular core.

(9) Hot compressed air is introduced into the textile hose body provided with the thin rubber layer or lining and the pressure is kept therein.

(10) While the internal pressure is being applied the hose is externally heated by infra-red ray tubes to complete vulcanization and strong bonding between the rubber lining and the textile hose.

The present invention also provides an apparatus for efficiently and continuously carrying out the above steps.

These and other objects, features and advantages of this invention will be more clearly understood from the following detailed description which will be made in connection with the accompanying drawings in which.

The first step of this invention is to coat the outer surface of a tubular core with a thin rubber layer and this may be carried out by dipping the tubular core inflated to its full tubular shape into a rubber latex solution bath for a predetermined period of time, withdrawing it from the solution bath, externally vacuum-treating the same for removing any foam or bubbles existing in the latex layer while it is still wet on the core tube, and then heating the same to set a dried thin rubber layer on the tubular core. This may be repeated until a desired thickness of the rubber layer is obtained.

The tubular core should be made of a soft and flexible plastic material which, preferably, does not have a very good adhesive affinity with rubber latex to facilitate separation of the tubular from the thin rubber layer in a later step of manufacture. For further facilitating this separation it is preferable to use a material which will contract under heat. Examples of the material for the tubular core are soft polyvinylchloride resin, polyethylene resin and other soft, flexible and plastic synthetic resins. The length of the tubular core is approximately equal to or slightly longer than that of a textile hose body and the external diameter thereof is slightly less (for example, by 10–15%) than the inner diameter of the textile hose body.

The thickness of the rubber layer to be formed on the tubular core may be controlled by varying the concentration of the rubber latex solution, the period of time of dipping or passing of the tubular core through the bath and the number of cycles of the above mentioned dipping, vacuum treating and drying operations. Generally, a thickness ranging from about 0.15 to 1.5 mm. is preferred.

As for a latex material for the rubber latex solution into or through which the tubular core is dipped or passed, concentrated natural rubber latex is most preferred. To this latex, vulcanizing agent (e.g. sulphur), vulcanization accelerator, age-resistor, stabilizer, etc. are added in the conventional manner. No detailed explanation on these additives should be necessary as they are very well known in the art. It is generally preferable that the latex solution has about 40–60% solid content and has a viscosity of about 50–200 centipoises.

In place of the natural rubber latex mentioned above, other latex solutions well known in the art may be used. Thus, chloroprene or nitril synthetic rubber latex may be used for those hoses which are required to have special properties such as oil resistance.

Figure 1:
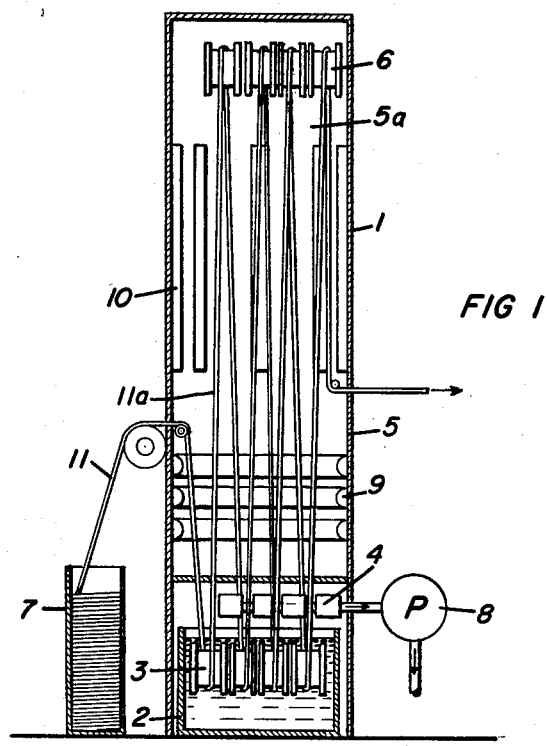
FIG. 1 is a schematic vertical section of an apparatus for forming a thin rubber layer or coating on the outer surface of a tubular core.

The formation of the thin rubber layer on the tubular core may be carried out, for example, by an apparatus shown in FIG. 1. The apparatus comprises a vertical casing 1, a rubber latex solution bath 2 placed in and at the bottom of the casing 1, a bottom guide roller 3 arranged in said bath 2, a plurality of cylindrical suction boxes 4 placed just above the bath 2, a heating box 5 arranged above the suction boxes and within the casing 1, and an upper guide roll 6 placed at the top of and within the heating box 5. In the heating box 5 there is provided a suitable heating means, such as electric heating wires and infra-red ray tubes. In the apparatus shown, the heating means consists of lower extreme infra-red ray tubes 9 and upper near infra-red ray tubes 10 so arranged along the inner wall of the heating box 5 as to surround the heating chamber 5a defined by the box 5. Each of the cylindrical suction boxes 4 is connected to a suction pump 8 through a pipe. Indicated with the reference numeral 7 is a reservoir for storing a length of a tubular core 11.

Figure 4:
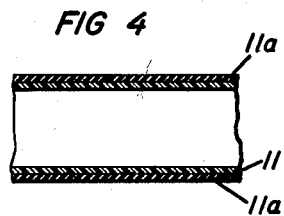
FIG. 4 is a longitudinal section of a part of a tubular core with a thin rubber layer thereon.
Figure 5:
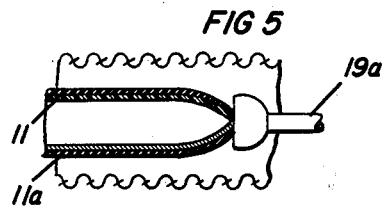
FIG. 5 is a schematic longitudinal section of a textile hose body showing the step of inserting a tubular core carrying a thin rubber layer into the hose body.
Figure 6:
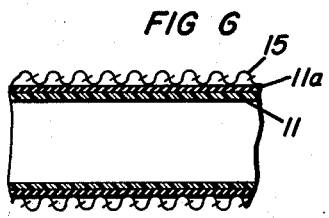
FIG. 6 is a schematic longitudinal section of a textile body with a thin rubber layer carrying tubular core therein, in the inflated state.
Figure 7:
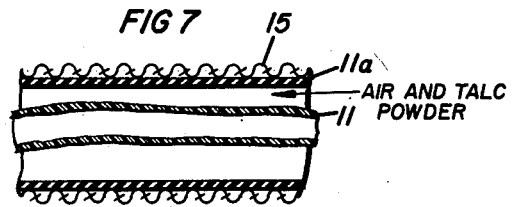
FIG. 7 is a schematic longitudinal section similar to FIG. 6 but showing the state where compressed air admixed with an exfoliation aid is injected according to this invention to peel off and remove the tubular core.
Figure 8:
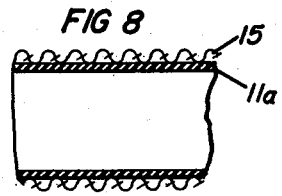
FIG. 8 is a schematic longitudinal section of a part of a completed hose with a thin rubber lining on the inner wall thereof.

The tubular core 11 is closed air-tightly at its one end and the other end is attached to a source of pressure so as to apply pressure to the inside of the core. When the tubular core is inflated and shaped into its full tubular form the said other end is disconnected from the pressure source and is closed. The core 11 so inflated and formed into the full tubular shape is fed from the reservoir 7 into the casing 1 through a suitable inlet formed on the wall thereof and then guided downwards to be dipped into the latex bath 2 by the lower guide roller 3. The tubular core 11 thus passes through the latex bath 2 and is then upwardly withdrawn therefrom by the guide of the upper guide roller 6. In its upward travel the tubular core 11 with a thin rubber latex-layer thereon is first passed through the suction box 4 so that small bubbles or foam, if any, are removed under vacuum. The tubular core 11 is then heated by the infra-red ray lamps 9 by which the latex is caused to coagulate, and then further heated by the infra-red ray lamps 10 by which heat-drying is completed so as to form a thin rubber layer or film. The tubular core 11 passed around the upper guide roller 6 and then guided by the lower guide roller 4 downwardly to dip again into the latex bath 2 and subsequently be subjected to the vacuum treatment and heating just mentioned above. This cycle is repeated several times (four in the apparatus shown) until a desired thickness (e.g. 0.15–1.5 mm.) of the thin rubber layer or film 11a (FIG. 4) is formed on the tubular core 11. Although not critical, the running speed of the tubular core 11 in the apparatus is usually 0.5–2 m. per minute and the residence time of the core in the bath is about 20–60 seconds. The temperature in the chamber 5a may be about 40–70° C., although this is not critical. After passing through the apparatus, the tubular core 11 with the rubber layer 11a is stored for several days for ripening. Then the internal pressure is released and the core is allowed to become flat for treatment in the subsequent stage of manufacture.

The vacuum treatment in the above steps is very important. It is generally desired to use a rubber latex solution having a relatively high viscosity which would tend to cause bubbles or foam to be present in the latex. Therefore, when the rubber layer is formed by using such latex it would include such bubbles or foam which would cause the layer to the weak in spots or leaky. According to the invention, however, these bubbles or foam are removed by the vacuum treatment so that the rubber layer or film is more reliable even when it is thinner. I have found that according to this invention, the thickness of the layer or film may be reduced to even about 0.15 mm. without any risk of leakage. It will further be appreciated that the thin film or layer makes the hose light and reduces the amount of the latex to be used.

The subsequent step of manufacture is to insert the tubular core completed as above into a textile or woven hose body and bonding the thin rubber layer or film on the inner wall of the hose body.

Any conventional textile or woven hose body may be used in this invention. Thus, the hose may be woven from natural fibres such as cotton, flax, etc. and synthetic fibres such as polyamides, polyesters, polyvinyl alcohols, etc.

Figure 2:
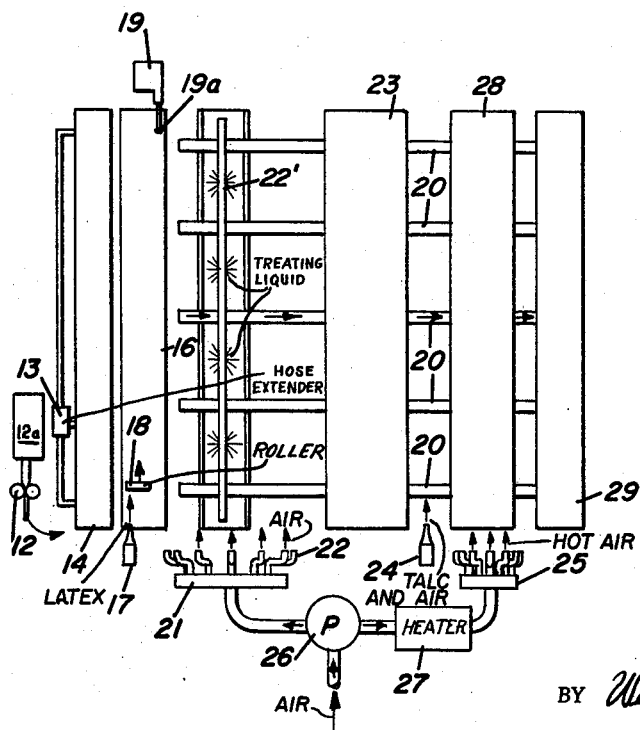
FIG. 2 is a diagrammatic plan view of a hose manufacturing apparatus according to the present invention.

Usually, a textile hose is flat folded and compactly coiled so as to facilitate its handling, conveyance and storing. If it is kept for a long time in such a state, it will take a flatfolded shape when it is uncoiled and this shape makes it difficult to insert the tubular core therein. Therefore, it is preferable to refold the hose along different fold lines so as to cause it to become self-supporting. This folding operation may be carried out by any suitable device such as a pair of press-contacted rollers 12 to which hos 15 is fed from receptacle 12a and through the nip of which rollers 12 the hose 15 is passed (FIG. 2).

Figure 3:
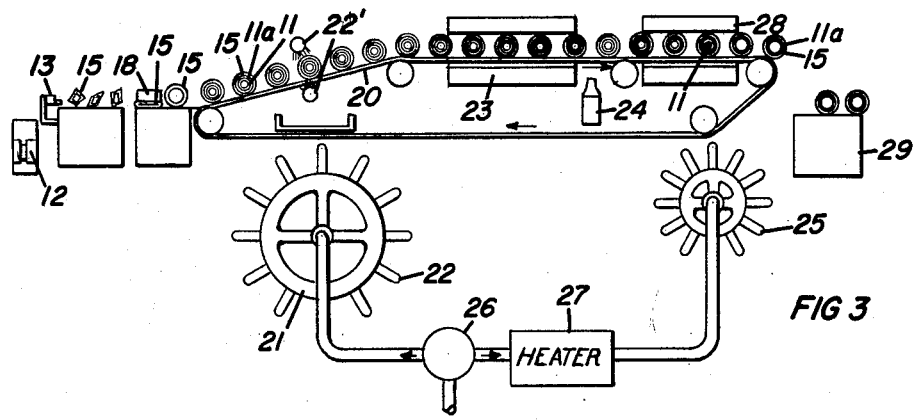
FIG. 3 is a schematic side elevation of FIG. 2.

The textile hose body 15 is then extended in a straight line and conveyed by a hose extender 13 which is movable along and longitudinally of a storing table 14, so as to place the hose body 15 longitudinally along on the table 14. After the hose 15 is pressed between rollers 12 it is attached to the hose extender 13 which is adapted to be reciprocably driven so as to extend the hose on the table 14 and then return to a point adjacent rollers 12. A plurality of hose bodies 15 (three are seen in FIG. 3) is stored on this table for supply one by one to the subsequent stage.

The hose body 15 is then transferred onto a work table 16. While the textile hose body 15 is placed on the table 16 and extends longitudinally thereof, a natural or synthetic rubber latex which has been made into an adhesive by mixing a milk casein or the like therein is injected inside the hose body 15 from one end thereof by a suitable injector 17 placed adjacent one end of the work table 16. Then a press roll 18 arranged to be movable on and longitudinally of the table 16 is press-rolled on and along the length of the hose body 15 from the said one end to the other so as to spread and distribute the injected latex adhesive uniformly in the hose body and also to squeeze out excess latex adhesive therefrom.

Then, compressed air is introduced into the collapsed hose body (by means which are not shown) to form it into a self-supporting tubular shape. Into this textile hose body 15, the tubular core 11 with the thin rubber layer 11a formed thereon is inserted. This insertion may be carried out by any suitable means such as by a drawing device 19 having a drawing rod 19a which is operated by said device to extend or retreat longitudinally of and through the hose and is adapted at its end to releasably grasp the end of the tubular core 11. Therefore, one end of this assembly is closed in air tight fashion. To the other end is secured a suitable closure preferably having a valve or cock adapted to be connected with or disconnected from a source of pressure or compressed air which will be described hereinafter.

It is preferable according to this invention that the subsequent steps of manufacture are carried out while the hose assembly is being conveyed continuously at a constant speed, although this conveyor system is not entirely necessary.

Thus, according to one preferred embodiment of this invention there are arranged a plurality of parallel endless belt conveyors 20 which are running in a direction (indicated with arrows in FIGS. 2 and 3) at right angles to the longitudinal axis of the hose body 15 placed thereon and at a predetermined speed (FIGS. 2 and 3). Each conveyor 20 has thereon suitable means (such as recesses) to receive and hold the hose body in position.

The hose assemblies 15 closed in air-tight fashion at both ends as mentioned above are placed one by one at desired intervals on the conveyor system 20 as shown in FIG. 3. Immediately thereafter, the closure of the hose assembly 15 is connected through the valve or cock to one of flexible tubes (not shown) which are in turn connected to the respective nozzles 22 extending from the periphery of a circular type compressed air dispenser 21 which is rotated in the direction of the arrow (FIG. 3) at a speed the same as that of the conveyors.

The dispenser 21 is connected to a source of pressure such as an air compressor 26. The dispenser 21 is conveniently placed adjacent the outermost conveyor as shown. Thus pressure (e.g. about 30–80 lbs./in.²) is applied to the inside of the hose assembly 15 so that the thin rubber layer 11a is pressed against and intimately contacted with the inner wall of the textile hose body. It will be understood that the hose assembly is inflated by this pressure and its full cylindrical or tubular shape is imparted thereto. The length of each flexible tube extending between the closure of the hose and the nozzle 22 on the compressed air dispenser 21 should be sufficient so that the hose is maintained under the internal pressure for a predetermined period of time of the travel of the hose on the conveyor, and the number of the flexible tubes connected to the nozzle 22 should be such that pressure can be applied to all the hoses which travel with the conveyor means for a predetermined period of time until they reach the next step of manufacture.

Thus, each hose assembly is conveyed, at the room or ordinary temperature, very slowly (e.g. 2–6 cm. per minute) with a constant internal pressure being applied, for a predetermined period of time. During this travel, the previously injected latex adhesive between the textile hose body and the thin rubber layer on the tubular core will penetrate into the textile structure and be coagulated due to the pressure so that a strong bonding between the textile hose 15 and the thin rubber layer or film 11a is obtained.

In addition, during this travel, a surface treating agent is applied to the external surface of the textile hose. This application is carried out by any suitable means such as a pair of sprayers 22', 22' respectively arranged above and below the conveyors. The sprayer 22' may be a perforated pipe connected to a source (not shown) of the treating liquid under pressure. The surface treating agent is well known to those skilled in the art. Usually it is a fluid containing wax emulsion and synthetic rubber latex and is used for imparting to the hose wear resistant, anti-corrosive, weather proof and other desired properties. In the known art, this application is carried out as a separate procedure after the manufacture of the hose, whereas according to this invention it is effected during the bonding operation under the internal pressure. This means that time is saved and the cost of manufacture is reduced. More important, however, is the fact that since the application is carried out while the textile structure of the hose is stretched or expanded by the internal pressure the penetration of the treating agent is ensured so that an excellent finishing effect is obtained.

After the predetermined period of time (e.g. about 1–2 hours after the internal pressure is first applied), the closure of the hose assembly is disconnected from the supply of pressure and the valve or cock thereon is opened to release the internal pressure. At this time the bonding agent or latex adhesive has been completely coagulated due to the pressure and the bonding between the textile hose body and the thin rubber layer or film has been almost completed.

The hose assembly 15 from which the internal pressure has been released is then subjected to the subsequent heating and drying treatment so as to make the said bonding more complete, to sufficiently dry the hose wetted with the surface treating fluid and also to facilitate the exfoliation of the tubular core as hereinafter fully described. For this purpose, in the embodiment shown, the hose 15 on the conveyor 20 is continuously passed through a heating zone comprising upper and lower near infra-red ray lamps 23 arranged respectively above and below the belt system 20 The heating zone is preferably kept at a temperature between about 40 and 70° C. This heat-treatment under non-pressure conditions is particularly significant in that the tubular core 11 made of a synthetic resin will be allowed to slightly contract due to the heat so that it is more exfoliated from the rubber layer 11a now bonded to the inner wall of the textile hose body.

After drying the hose assembly, it is conveyed to the subsequent exfoliation stage where compressed air admixed with a finely didived exfoliation aid such as talc powder and the like is injected or forced from an injector 24 between the tubular core 11 and the rubber layer 11a at one end of the assembly. By this procedure, the tubular core 11 is very readily exfoliated from the rubber layer 11a bonded on the hose, without causing any damage to the tubular core and the rubber layer or lining 11a.

The exfoliation step is a very important one in this invention. A natural or self exfoliation of the tubular core may be possible, but this would take a considerably longer time and make the satisfactory continuous mass production of hoses impossible, while if the tubular core is forcibly pulled there would be a danger that the rubber layer or lining and/or the tubular core would be damaged Furthermore, it is not easy to smoothly pull such a long and flexible tubular body out of the hose. According to this invention, however, the exfoliation is effected readily, smoothly, in a moment and without any damage. This is caused by the combination of the following successive steps: (1) the hose assembly is first kept under the internal pressure and at room or normal temperature, (2) the hose assembly is then heated and dried while it is in the non-pressurized condition, and (3) then compressed air with talc powder is forced between the tubular core and the rubber lining When a thin film of soft or flexible synthetic resin such as soft polyvinyl chloride resin, polyethylene resin, etc. is left for a long time under stretch or tension there would be caused a permanent strain which would not be relieved noticeably even if the stretch or tension is released. However, when the film so formed is heated it would contract and tend to resume the original shape. It will be appreciated that this invention has utilized this characteristic. The exfoliated tubular core may be manually and quite easily pulled or drawn out of the hose.

The textile hose body 15 with the thin rubber film lining 11a is again closed in air tight fashion at both ends and its one closure having a valve or cock thereon similarly to that explained before is connected to a flexible tube (not shown) which in turn is connected to the corresponding nozzle on a circular type hot compressed air dispenser 25. More detailed explanation about the structure, use and operation of this dispenser 25 and its associated members is unnecessary because it is substantially identical with that for the compressed air dispenser 21, except that compressed air to be applied to the hose in this stage should be hot Thus, a constant internal pressure by a hot compressed air is maintained inside the hose to inflate the same. The internal hot pressure is preferably about 30–80 lbs./in.² and about 90–130° C. The hot compressed air dispenser 25 is connected to the air compressor 26 through an air heater 27.

While the hot internal pressure is being maintained inside the hose 15, the hose is continuously conveyed and passed through a suitable vulcanizer 28 which, preferably, comprises extreme infra-red ray lamps having a wave length of about 3 microns The heating lamps are arranged below and above the conveyors and the vulcanizer 28 is so designed that the vulcanizing chamber is maintained at a temperature from about 90 to 130° C. The hose 15 is passed through this vulcanizer 28 usually taking about 20–50 minutes to complete the vulcanization of all the rubber material contained in the hose.

The use of the extreme infra-red lamps in the vulcanizer is very important. Under the continuous or conveyor system of the manufacture of hoses such as those having a length of 20–30 m. it is practically impossible to employ an enclosed or sealed vulcanizing pan or the like. Therefore, the vulcanizer would have to be sideopened and this would considerably reduce the heat efficiency. However, when extreme infra-red ray lamps are used an excellent heat efficiency is obtained even if the vulcanizer is side-opened. Since the lamps are tubular, the heat will be uniformly distributed along the length of the hose so that a uniform and effective vulcanization is obtained.

After passing through the vulcanizer 28, the hose closure is disconnected from the pressure supply and removed. The completed hose with the thin rubber film lining is dropped from the conveyor onto a finishing table 29.

According to this invention, hoses of a length from about 20 to 30 m. can be continuously manufactured at a production speed of one per minute.

What I claim is:

1. An apparatus for continuously producing rubber lined hose, comprising in combination a means for continuously coating a thin layer of rubber on a plastic tubular core, means for feeding lengths of textile hose body into a stretched out position, a conveyor means extending from said feeding means in a direction transverse to the stretched out length of the hose body, an adhesive latex injecting means adjacent said conveyor means and directed transversely thereof for injecting latex into a length of hose body, means movable parallel to the stretched out length of the hose body for moving along the hose body for spreading the injected latex evenly therein, means for feeding coated lengths of plastic tubular core from said coating means into the lengths of hose body with the latex therein, means adjacent said conveyor and spaced therealong from the latex injecting and tubular core feeding means in the direction of movement of said conveyor and being movable therealong for supplying air under pressure to the tubular core, spray means above said conveyor means and spaced therealong from the latex injecting means and tubular core feeding means for spraying surface treating material on the exterior of the hose bodies being conveyed along the conveyor means, a first heating means above and below said conveyor means and spaced therealong from said air pressure means and said spray means, a powdered talc and air injection means spaced along said conveyor means and directed transversely thereof, means adjacent said conveyor and spaced therealong from said talc and air injection means and movable along said conveyor for supplying hot air under pressure, and a second heating means above and below said conveyor means and spaced therealong from said talc and air injection means.

2. An apparatus as claimed in claim 1 in which said second heating means comprises high temperature infrared lamps having a wave length of about 3 microns References Cited in the file of this patent

UNITED STATES PATENTS

| | | |
|---|---|---|
| 1,913,327 | Barnes | June 6, 1933 |
| 2,384,056 | Tritt | Sept. 4, 1945 |
| 2,392,967 | Balkin | Jan. 15, 1946 |
| 2,815,534 | Ising et al. | Dec. 10, 1957 |
| 2,891,581 | Roberts | June 23, 1959 |
| 2,926,699 | Wulms | Mar. 1, 1960 |